Oct. 6, 1931.  C. S. BRAGG ET AL  1,826,415
POPPET VALVE MECHANISM FOR POWER ACTUATORS
Original Filed Oct. 2, 1925  2 Sheets-Sheet 1
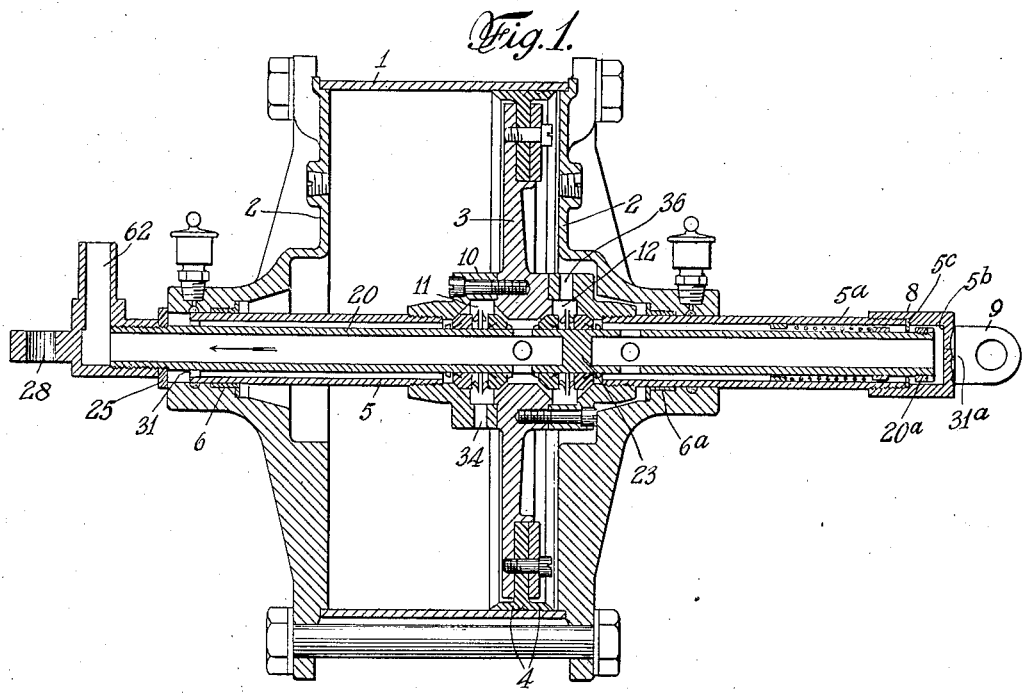
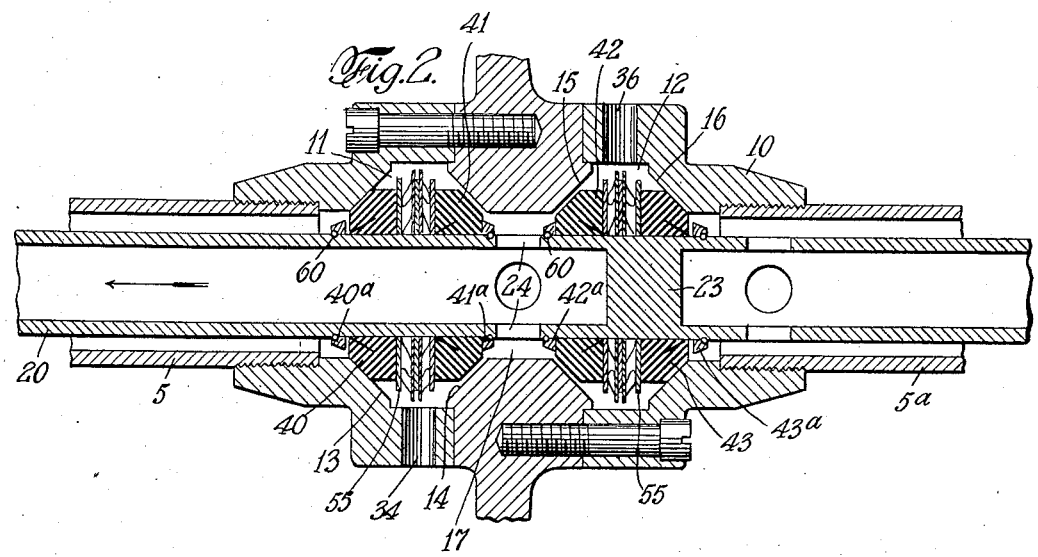

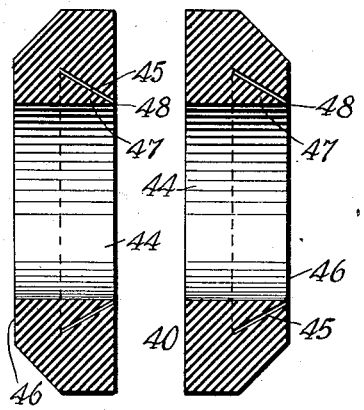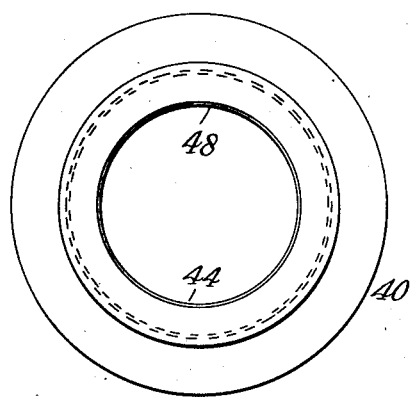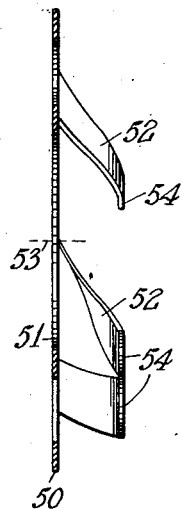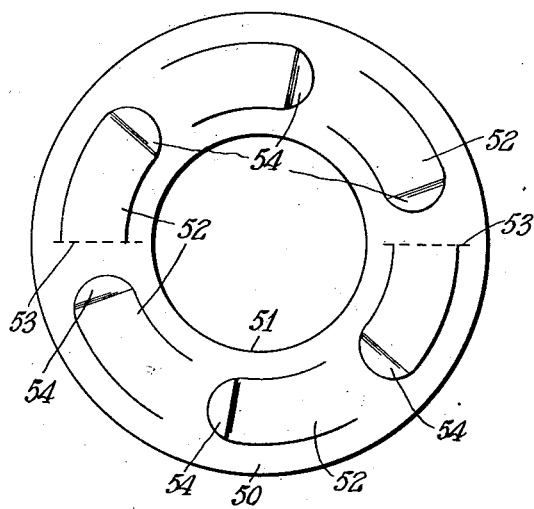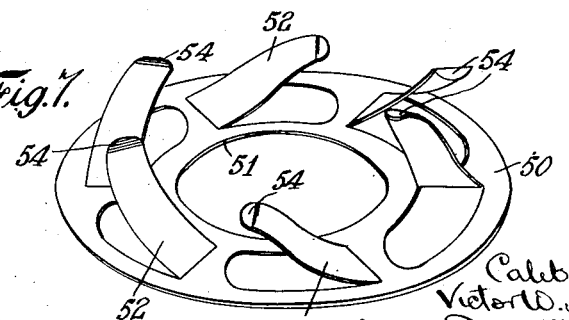

Patented Oct. 6, 1931

1,826,415

UNITED STATES PATENT OFFICE

CALEB S. BRAGG AND VICTOR W. KLIESRATH, OF LONG ISLAND CITY, NEW YORK, ASSIGNORS TO BRAGG-KLIESRATH CORPORATION, OF LONG ISLAND CITY, NEW YORK, A CORPORATION OF NEW YORK

POPPET VALVE MECHANISM FOR POWER ACTUATORS

Application filed October 2, 1925, Serial No. 60,018. Renewed December 3, 1930.

Our invention consists in the novel features hereinafter described, reference being had to the accompanying drawings which show one embodiment of our invention, selected by us for purposes of illustration, and the said invention is fully disclosed in the following description and claims.

In our former application for Letters Patent of the United States, filed November 22, 1924, and given Serial No. 751,481, we have illustrated, described and claimed certain poppet valve mechanism comprising a valve or a plurality of co-axial valves provided with an axial aperture or co-axial apertures to receive an actuating part movable longitudinally with respect to the valve or valves, means being provided yieldingly pressing the valve or valves toward its seat or their seats, and for sealing the apertures in the valves through which the actuating part extends, said actuating part being provided with means for effecting the operative movements of the valve or valves.

Our present invention is an improvement in the valve mechanism covered by our former application, and consists in new and improved retracting and sealing means for the valve or valves, and in the combination thereof with the valve or valves and its or their actuating mechanism as hereinafter more fully described and particularly pointed out in the claims.

In the accompanying drawings we have shown our improved valve mechanism arranged in connection with and constituting the reversing valve mechanism of a power actuator of the kind shown and described in our former application above referred to, but it is to be understood that our invention may be embodied in valve mechanism for any other purpose for which it is or may become desirable or advantageous.

Referring to the accompanying drawings which show one embodiment of our invention, selected by us for purposes of illustration.

Fig. 1 is a sectional view of a power actuator provided with one form of poppet valve reversing valve mechanism embodying our invention and especially arranged for use where the actuator is operated by atmospheric air acting on one face of the piston, working against suction or rarefication in the cylinder on the other side of the piston.

Fig. 2 is an enlarged sectional view of the valve mechanism shown in Fig. 1.

Fig. 3 is an enlarged sectional view of one of the valves detached.

Fig. 3a is a similar section of another of the valves.

Fig. 4 is an elevation of the valve shown in Fig. 3.

Fig. 5 is a plan view of one of the spring discs.

Fig. 6 is a cross sectional view of the same.

Fig. 7 is a perspective view of the spring disc.

In the drawings, 1, represents the cylinder of a power actuator closed at each end by heads, 2, which may be connected by bolts (not shown) or secured in position in any other desired manner. 3 is the double acting piston provided with oppositely disposed gaskets, 4, 4, and a hollow piston rod, 5, 5$^a$, extending from each end of its hub through a stuffing box, 6, 6$^a$, in the adjacent end of the cylinder. One of the piston rods, as, 5$^a$, is closed by a plug, 8, having an attaching lug, 9, for attaching it to the part to be actuated. The hub, 10, of the actuator piston is provided with two valve chambers, 11 and 12, each of which is provided with two oppositely disposed valve seats, preferably conical and co-axial with the piston. Chamber 11 contains the seats, 13 and 14, and chamber, 12, contains the seats, 15 and 16. Between the valve chambers the hub, 10, is provided with an outlet or suction chamber, 17. In this instance, each piston rod is provided with an air inlet, as apertures, 31, 31ª, through which atmospheric air may be admitted to the adjacent end of the cylinder when the valve engaging seat, 13, or 16, is opened.

20 represents the valve actuating part consisting in this instance of a sleeve passing longitudinally through the piston rods, 5 and 5ª, and through the hub of the piston co-axially with the valve seats therein, said sleeve being movable manually as hereinafter described, to effect the operation of the reversing valves. The valve actuating sleeve is divided into two parts by an interior plug or partition, 23, and the part at one side of the plug or partition is connected by apertures, 24, with the suction chamber, 17. The same portion of the valve actuating sleeve is provided adjacent to its end with an outlet pipe or passage, 62, which is preferably connected with the intake manifold of an internal combustion engine or other source of suction. The valve actuating sleeve is also provided with a perforated lug, 28, or other suitable means by which it may be connected with a suitable operator operated part, as the usual foot brake lever of an automobile, for example, provided with a retracting spring or a hand operated lever, or other actuating device. The valve actuating sleeve is also preferably provided with means for limiting its movement in a direction opposite to that indicated by the arrows in Figs. 1 and 2. In this instance the sleeve is shown provided with a collar, 25, adapted to engage the end of the cylinder when the piston is in its retracted or off position for a purpose hereinafter described.

The valve chamber, 11, is connected by a port or ports, 34, with the cylinder, on one side of the piston, and the valve chamber, 12, is provided with a similar port or ports, 36, communicating with the cylinder on the other side of the piston.

Within each valve chamber the valve actuating sleeve is provided with a pair of oppositely disposed valves, preferably conical, engaging the opposite valve seats before described, and located between valve engaging and operating collars with which the sleeve is provided. These valves are mounted on the sleeve in such manner as to permit the sleeve to move through them, and we provide means for sealing the opening in the valve through which the valve actuating sleeve passes and means for yieldingly pressing the valves toward and upon their seats. In the present instance we have shown the valve actuating sleeve provided within the valve chamber, 11, with the oppositely disposed valves, 40 and 41, and within the valve chamber, 12, with the oppositely disposed valves, 42 and 43. The valves are preferably made of molded rubber and each valve is provided with a central aperture, indicated at 44 in Fig. 3, which fits the valve actuating sleeve tightly, while permitting said sleeve to move longitudinally therethrough. In order to insure a tight joint at all times between each valve and the sleeve, the valve is preferably provided with narrow, annular recess or slit, 45, extending in an inclined direction back from the edge of the central aperture, 44. The valves, 40 and 43, have this recess or slot adjacent to the seat engaging end, 46, of the valve, as shown in Fig. 3, while the valves, 41 and 42, have this recess adjacent to the rear or opposite face, as shown in Fig. 3ª, in either providing an interior conical portion, 47, terminating in a thin, flexible lip, or portion, 48, inside of the recess. This thin, flexible portion or lip is held firmly upon the outer surface of the valve actuating sleeve, both by its inherent elasticity and by air pressure within the slit or annular recess, 45, thus sealing the aperture, 44, against leaks.

For yieldingly seating the valves we employ elastic cushioning means consisting in this instance of an annular spring plate, or plates, preferably two spring plates of the kind shown and illustrated in detail in Figs. 5, 6 and 7. Each of these devices consists of an annular plate of spring metal, indicated at 50, having a central aperture, 51, fitting slidingly over the valve actuating sleeve, 20, and having a plurality of spring fingers disposed in a circular series around said aperture. These fingers, 52, are preferably formed by stamping up integral portions of the ring, and preferably extend, each, in a curved direction concentric with aperture, 51, from the radial line of their union with the plate, indicated at 53, in dotted lines in Fig. 5. The outer ends of the fingers are bent into parallelism with the plane of the plate, as indicated at 54.

In assembling the pairs of valves, 40, 41, and 42, 43, we prefer to arrange between them two of these spring rings or plates placed back to back, and we find it convenient to insert flat washers, 55, between the spring plates and between the flattened portions, 54, of the spring fingers of each spring plate and the adjacent valve, as clearly shown in Fig. 2. We do not wish to be limited to this particular arrangement, however, as the washers might be omitted, and a single spring ring, with or without washers, might be employed.

The valve actuating rod is provided with an actuating collar for each valve, indicated at 40ª, 41ª, 42ª and 43ª, secured to the sleeve in any desired way, as by spring rings, 60. The collars are so located on the sleeve, that when the piston is in the off position that is to say the position in which the piston is arrested at the inner end of its return movement after a power stroke, and in which it normally remains until again actuated, and the sleeve, 20, is arrested by the collar, 25, engaging the end of the cylinder, or a part connected therewith, the valves, 40 and 43, will be firmly seated and their respective collars, 40ª and 43ª, will be at a slight distance therefrom, while the valves, 41 and 42, will be in engagement with their collars, 41ª and 42ª, and both will be held slightly off of their seats. This arrangement connects the outlet or suction chamber with the cylinder on both sides of the piston, and maintains a state of rarification in both ends of the cylinder, and the piston will be in a balanced condition.

If the valve actuating sleeve is moved in the direction of the arrows in Figs. 1 and 2, the first effect will be to permit the valve, 42, to seat and to open the valve, 41, further, after which the collar, 43ª, will engage valve, 43, and open it, thus continuing the connection between the cylinder forward of the piston with the suction chamber, but admitting atmospheric air through the hollow piston rod, 5ª, to the cylinder on the opposite side of the piston, this causes the piston to move in the direction of the arrows, and to the same extent that the sleeve, 20, is moved, and the compression of the spring plates, 50, 50, between the pairs of valves, which results from the movement of one valve of each pair away from its seat, increases the pressure of said spring plates exerted on the other valves and holds them firmly seated. No appreciable amount of air will be drawn into the suction means, as the intake manifold through the pipe, 62, however, as the portion of the cylinder forward of the piston is already exhausted. There is therefore no effect produced on the explosive charges delivered to the engine, where the intake manifold is relied upon as the source of suction, when the actuator piston is moved forward in the direction of the arrows in Figs. 1 and 2, to apply brake mechanism, for example, connected with the piston rod, 5, in any desired or usual manner.

When the forward movement of the valve actuating sleeve stops, the piston continues to move forward with respect to said sleeve, permitting the valve, 43, to close, thereby shutting off the source of pressure. Any continued forward movement of the piston would open valve, 42, which would exhaust any surplus air admitted, so that the piston would remain in a balanced position, with the valve, 41, open and all others closed.

When the movement of the valve actuating sleeve, 20, is reversed, valve, 43, will be firmly seated, and valve, 42, opened, while valve, 41, will be firmly closed, and valve, 40, opened. This connects the suction chamber, 17, with the cylinder in rear of the piston, and connects the forward end of the cylinder with the atmosphere, in this instance through hollow piston rod, 5. The air formerly admitted in rear of the piston will be withdrawn into the suction means, and delivered into the intake manifold or other suction means, through pipe, 62, which is preferably provided with an adjustable restricting valve (not shown) which will be so adjusted as to prevent the stalling of the engine, if idling.

The piston thus returns to normal position, and just before it reaches the "off" or normal position, the shoulder, 25, or valve actuating sleeve, 20, engages the end of the cylinder and arrests the rearward movement of the sleeve. As the piston moves slightly with respect to the sleeve, 20, in coming into the "off" or neutral position, valve, 40, closes, and valve, 41, opens slightly, permitting an instantaneous equalization of pressures on opposite sides of the piston, and as both ends of the cylinder are then in communication with the suction or outlet chamber, 17, the air will be exhausted from the cylinder on both sides of the piston.

It will be understood that when the parts are assembled the spring plates, 50, will be compressed to such extent that they normally tend to firmly seat the adjacent valve, or valves, and do seat them except when the valves are held off their seats by the respective actuating collar on the valve actuating sleeve. When the valve actuating sleeve is moved in a direction to open a valve or valves, the spring plates are further compressed, and where, as herein shown, these cushioning devices are employed between oppositely disposed valves, and one of the pair is opened, this increased compression is transmitted to the other valve of the pair to hold it more firmly seated.

While we have described the operation of the valve mechanism in a construction in which the piston is operated by atmospheric pressure working against a partial vacuum, it is to be understood that this is equally applicable in installations in which the piston is operated by pressure above atmospheric, working against atmospheric pressure, or against a partial vacuum.

It is to be further understood that while the particular form of valve, providing means for sealing its central aperture, combines peculiarly well with the specific form of cushioning means shown and described, the said valve could be employed with other forms of cushioning means, and the cushioning means could be employed with other forms of valve, either with or without sealing means.

We prefer to provide means for enabling the operator to add his physical force to that exerted by the actuator piston, or to move the piston in case of failure of power. In this instance we have shown the portion of valve sleeve, 20, which extends into piston rod, 5ª, provided with an enlargement, or collar, 20ª, located in an annular recess in the piston rod between shoulders, 5ᵇ and 5ᶜ, which limit the extent of lost motion between the valve actuating sleeve and the piston rod. This construction however forms no part of our present invention, and is not specifically claimed herein.

What we claim and desire to secure by Letters Patent is:

1. The combination with a valve seat, of a poppet valve having an angular seat engaging portion, and provided with a central aperture, a longitudinally movable valve actuating part fitting said central aperture in the valve, and supporting it coaxially with the seat, said part being movable through the valve and being provided with means for engaging the valve to open it when moved in one direction, yielding means normally pressing said valve toward its seat, said valve being provided with sealing means forming part of the valve surrounding said central aperture for making an air tight connection between the valve and said valve operating part while permitting its longitudinal movement with respect to the valve.

2. The combination with a valve seat, of a poppet valve having an angular seat engaging portion, and provided with a central aperture, a longitudinally movable valve actuating part fitting said central aperture in the valve, and supporting it coaxially with the seat, said part being movable through the valve and being provided with means for engaging the valve to open it when moved in one direction, yielding means normally pressing said valve toward its seat, said valve being provided with yielding sealing portions surrounding its central aperture movable independently of the other portions of the valve for effecting an air tight joint between the valve and said valve operating part while permitting the longitudinal movement of said part with respect to the valve.

3. The combination with a valve seat, of a poppet valve having an angular seat engaging portion, and provided with a central aperture, a longitudinally movable valve actuating part fitting said central aperture in the valve, and supporting it coaxially with the seat, said part being movable through the valve and being provided with means for engaging the valve to open it when moved in one direction, yielding means normally pressing said valve toward its seat, said valve being provided with annular yielding sealing portions surrounding its central aperture, and an annular recess surrounding said sealing portions of the valve on the face thereof exposed to pressure, said sealing portions forming an air tight connection between the valve and said operating part, while permitting the longitudinal movement of said part with respect thereto, and said recess being adapted to receive pressure fluid and force said sealing portions of the valve into sealing contact with said valve actuating part.

4. The combination with a valve seat, a poppet valve for engaging said seat, provided with an axial aperture and an annular seat portion, a longitudinally movable actuating part extending through said aperture and having a sliding engagement therewith, and provided with a valve engaging part for moving the valve with respect to its seat, of a yielding retracting means for engaging said valve and pressing it in a direction to seat it, said valve being provided with elastic conical sealing portions surrounding said axial aperture and co-axial therewith and terminating in a thin flexible lip adjacent to one face of the valve, and engaging said actuating part so as to form a tight joint therewith.

5. The combination with a valve seat, a poppet valve for engaging said seat, provided with an axial aperture and an annular seat portion, a longitudinally movable actuating part extending through said aperture and having a sliding engagement therewith, and provided with a valve engaging part for moving the valve with respect to its seat, of a yielding retracting means for engaging said valve and pressing it in a direction to seat it, said valve being provided with elastic conical sealing portions surrounding said axial aperture and co-axial therewith and terminating in a thin flexible lip adjacent to one face of the valve, and engaging said actuating part so as to form a tight joint therewith, said valve being provided with an annular recess adjacent to and surrounding the outer face of said conical sealing portions, to afford access of pressure fluid to said sealing portions to press them upon the actuating part.

6. The combination with a valve seat, a poppet valve for engaging said seat, provided with an axial aperture and an annular seat portion, a longitudinally movable actuating part extending through said aperture and having a sliding engagement therewith, and provided with a valve engaging part for moving the valve with respect to its seat, of a yielding retracting means for engaging said valve and pressing it in a direction to seat it, said valve being formed of molded rubber and provided with an elastic conical sealing portion surrounding it, said axial aperture terminating in a thin flexible lip adjacent to one face of the valve, and having an annular recess surrounding the exterior conical face of said sealing portion.

7. The combination with a valve seat, of a poppet valve for engaging said seat, formed of elastic material and provided with a central aperture and an angular seat engaging portion, a longitudinally movable valve actuating part fitting the said central aperture and supporting the valve coaxially with its seat, said part being movable through the valve and provided with means for engaging the valve to open it when moved in one direction, yielding means normally pressing the valve toward its seat, said valve being provided with integral sealing portions surrounding said aperture and said actuating part and held in air tight engagement therewith, while permitting the longitudinal movement of said part therethrough.

8. The combination with a valve seat, of a poppet valve for engaging said seat, formed of elastic material and provided with a central aperture and an angular seat engaging portion, a longitudinally movable valve actuating part fitting the said central aperture and supporting the valve coaxially with its seat, said part being movable through the valve and provided with means for engaging the valve to open it when moved in one direction, yielding means normally pressing the valve toward its seat, said valve being provided with annular integral sealing portions surrounding said aperture, and the valve actuating part, and with an annular recess on one face of the valve surrounding said sealing portions.

9. A valve comprising a body of resilient material having a central aperture to receive a valve operating rod, said body having walls perpendicular to the axis of said aperture and provided with an annular kerf extending inwardly from one of said walls and defining with said aperture a sealing lip arranged to engage and seal against said operating rod.

10. A valve comprising a body of resilient moldable material having a central aperture to receive a valve operating rod, said body having substantially parallel walls perpendicular to the axis of said aperture, one of said walls cut to provide an angular seating portion, said body provided with an annular kerf extending inwardly from one of said walls at the juncture thereof with the aperture and on diverging lines to produce a thin edged annular sealing lip.

11. The combination with a power actuator including a cylinder and a piston therein, controlling valve mechanism and means for establishing differentials of fluid pressure on opposite faces of said piston to move the same in opposite directions, said valve mechanism comprising in part a valve body of resilient material having a central aperture and walls perpendicular to the axis of said aperture, said body having a kerf extending inwardly from one wall to form an annular sealing lip, a valve operating rod fitting the aperture in the body and movable therethrough, and means on the rod to move the body with the rod, said kerf extending from the wall exposed to the higher pressure fluid whereby said higher pressure fluid will enter the kerf and act upon the lip to force the same into sealing contact with the rod.

12. A valve subjected to and controlling differentials of fluid pressure and comprising a body of moldable material having a central aperture to receive a valve operating rod, said body being movable with and with respect to said rod, and means integral with said body and acted upon by the higher pressure for producing a sealing engagement between said rod and value at all times.

In testimony whereof we affix our signatures.

CALEB S. BRAGG.
VICTOR W. KLIESRATH.